United States Patent [19]
Pertessis

[11] Patent Number: 6,034,503
[45] Date of Patent: Mar. 7, 2000

[54] METHOD AND APPARATUS FOR STARTING MOTORS

[76] Inventor: John Pertessis, 3300 Hampton Ct., Mays Landing, N.J. 08330

[21] Appl. No.: 08/877,737

[22] Filed: Jun. 17, 1997

[51] Int. Cl.⁷ ..................................................... H02P 1/42
[52] U.S. Cl. ........................................... 318/785; 318/786
[58] Field of Search .................................. 318/778–797, 318/785, 786, 749–756

[56] References Cited

U.S. PATENT DOCUMENTS

| | | | |
|---|---|---|---|
| 4,658,195 | 4/1987 | Min .......................................... | 318/786 |
| 4,687,982 | 8/1987 | Palaniappan ............................. | 318/763 |
| 4,745,347 | 5/1988 | Wrege et al. ............................ | 318/744 |
| 4,804,901 | 2/1989 | Pertessis et al. ........................ | 318/786 |
| 5,559,418 | 9/1996 | Burkhart .................................. | 318/785 |
| 5,973,473 | 10/1999 | Anderson et al. ....................... | 318/785 |

*Primary Examiner*—David Martin
*Attorney, Agent, or Firm*—Kaplan & Gilman, LLP

[57] ABSTRACT

A method of reinstating a start winding is disclosed wherein the start winding is disconnected when the main winding motor current reaches a predetermined value, but is only reinstated when the start winding voltage has a predetermined relationship to the main winding motor current. The method uses a solid state induction motor starter circuit which requires little or no adjustment during the life of the motor.

2 Claims, 3 Drawing Sheets

METHOD AND APPARATUS FOR STARTING MOTORS

TECHNICAL FIELD

This invention relates to motors, and more particularly, to an improved method and apparatus for starting an induction motor that requires a starting switch to operate and for providing for automatic restarting of an induction motor in the event of increased load tending to slow the motor and possibly lead to stall.

BACKGROUND OF THE INVENTION

A basic diagram of the important elements of a typical induction motor is shown in FIG. 1. The motor 100 includes a rotor 103, a start winding 102, and a main winding 101. Also included are an optional capacitor 104 and a start winding switch 105.

In operation, the start winding 102 and the main winding 101 are utilized to start the motor. The start winding 102 is required in addition to main winding 101 in order to generate a rotating torque field until the rotor 103 is traveling at sufficient speed in order to generate its own field. At that point, the start winding is typically switched out of the system by some type of detection circuit which opens switch 105.

Optional capacitor 104 may be used to assist in creating a phase difference between the fields produced by start winding 102 and main winding 103. Other induction motors (not shown) include an additional capacitor which is always in the circuit.

One issue of importance is the reinstatement of the start winding 102 after the motor is running. More specifically, if the load on the motor increases, the rotation of the rotor 103 will slow. As the rotor 103 slows down, the torque field it generates decreases, eventually reaching the point where it is insufficient to keep the rotor 103 rotating. Accordingly, it is required that the start winding be reinstated.

If the start winding is reinstated after the motor has slowed too much, motor stall will result and the motor may not be able to overcome the overload condition which caused the stall. If the start winding is reinstated when the rotor 103 is moving too fast, then the motor may be damaged. Accordingly, it is important that the start winding be reinstated at the appropriate rotor speed during increased load. Specifically, as load increases and rotor speed decreases, the start winding should be reinstated at approximately 30 percent of full speed, with a tolerance of approximately 10 percent.

U.S. Pat. No. 4,804,901 describes a circuit for disconnecting the start winding and for reconnecting the start winding when the motor experiences an increase in load and thus, a motor stall. The '901 patent is incorporated herein by reference.

Typically, the main winding experiences maximum current when the rotor is at a stand still. The main winding current at the point where the rotor 103 stops moving is called the lock rotor current. As the speed of rotor 103 increases, current through main winding 101 decreases from the lock rotor value to a lower value. It is desirable to disconnect the start winding 102 when the rotor 103 is at approximately 75 percent full speed. This corresponds, as described in the '901 patent, to a current in main winding 101 of approximately 80 percent of the lock rotor current.

Thus, when the rotor 103 begins turning, it generates an initial current. As the speed of revolution increases, the current starts to decay. When the main winding current reaches a point at 80% of its initial value, the rotor is running at approximately 75% speed of revolution. It is at this point that the start winding is to be initially disconnected from the circuit as the field generated by the rotor 103 is sufficient to keep motor 100 running.

One way of reinstating the start winding 102 when the motor becomes loaded is to store a value equal to a particular percentage of the initial main winding motor current, say 80 percent. As the rotor 103 rotates, if a load is placed upon such rotor such that the rotor slows down, the main winding current will increase above 80 percent of its initial value. At such point, the start winding may be reinstated.

The problem with such a system is that the 80 percent value is acceptable when the motor is initially started in order to disconnect the start winding. Specifically, when the main winding current falls below a value 80 percent of its initial value, the start winding is disconnected. However, during operation, variations in the motor operating environment such as temperature and power supply and variations in the motor characteristics such as the main winding impedance, can cause the initial 80 percent value to be too high for proper reinstatement and possibly prevent proper reinstatement of the motor start winding. The 80 percent value can also be too low, therefore causing the start winding to be reinstated too soon, prematurely. Additionally, the 80 percent value may decay, in analog implementations, rendering the entire arrangement inaccurate.

Storing the main winding current reference value digitally so that it does not decay would represent one solution, however, this increases the cost and is thus less desirable. The varying motor envelope conditions will not be adapted to with this method as stated previously.

In view of the above, there exists a need in the art for an improved technique of disconnecting a start winding as motor speed increases and then reinstating the start winding when a motor load decreases rotor speed.

SUMMARY OF THE INVENTION

The above and other problems of the prior art are overcome in accordance with the present invention which relates to an improved technique of disconnecting and then determining when to reinstate the start winding in an induction motor, and reinstating same. In accordance with the invention, the magnitude of the main winding current is compared to a predetermined percentage of the main winding initial current after the motor initially starts. However, once the main winding current falls below the predetermined percentage of its initial value, indicating that the torque field generated by the rotor 103 is sufficient to keep the motor running, the reinstatement is governed by two other dynamically variable parameters.

Dynamically variable, for purposes hereof, means parameters which vary as a function of the operation of each motor, as opposed to a fixed reference value. For example, the arrangement of the previously incorporated '901 patent compares the main winding current to a fixed percentage of the initial current. Since the reference value is a fixed percentage, it does not vary as a function of the operation of the motor and is thus not considered dynamically variable. The main winding current, or start winding induced voltage, are examples of dynamically variable parameters since each of these parameters changes as the motor operates.

DESCRIPTION OF THE PREFERRED EMBODIMENT

Figure 1:
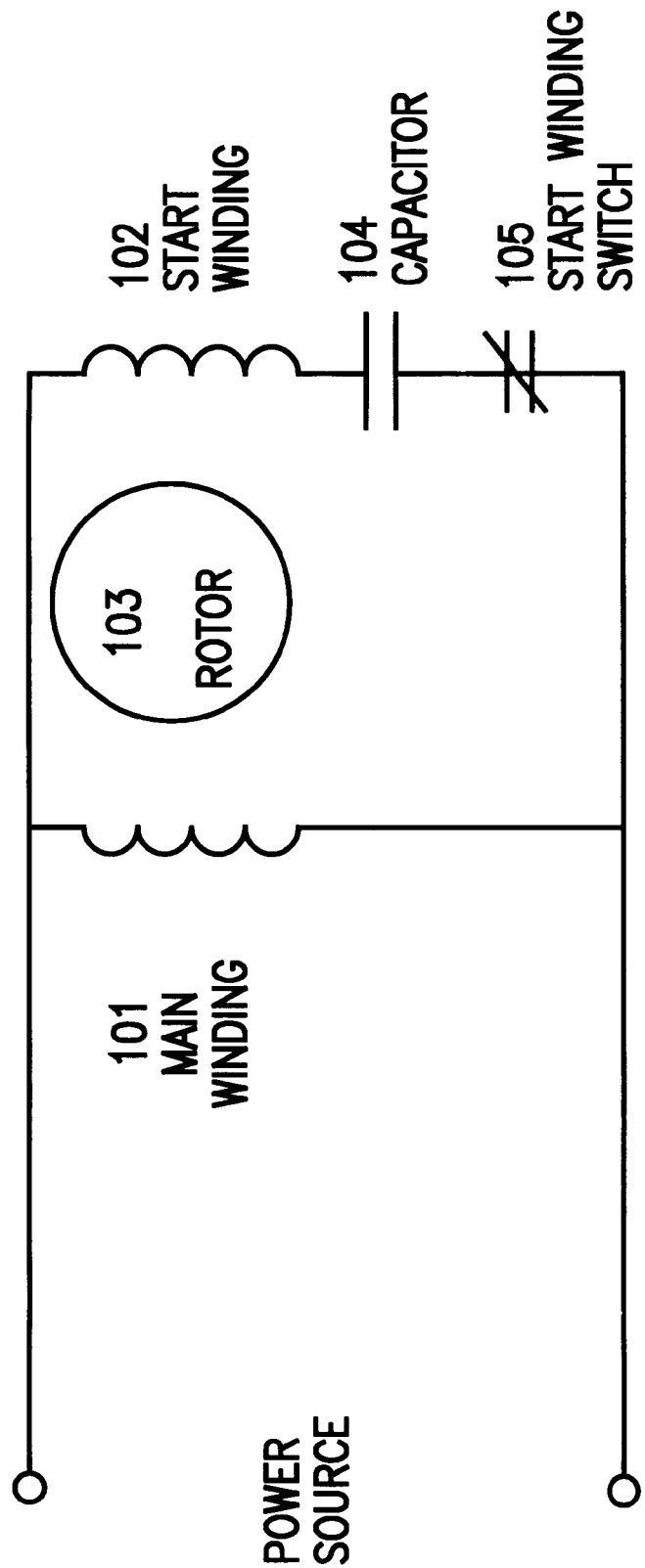
FIG. 1 shows the basic components of an induction motor.
Figure 2:
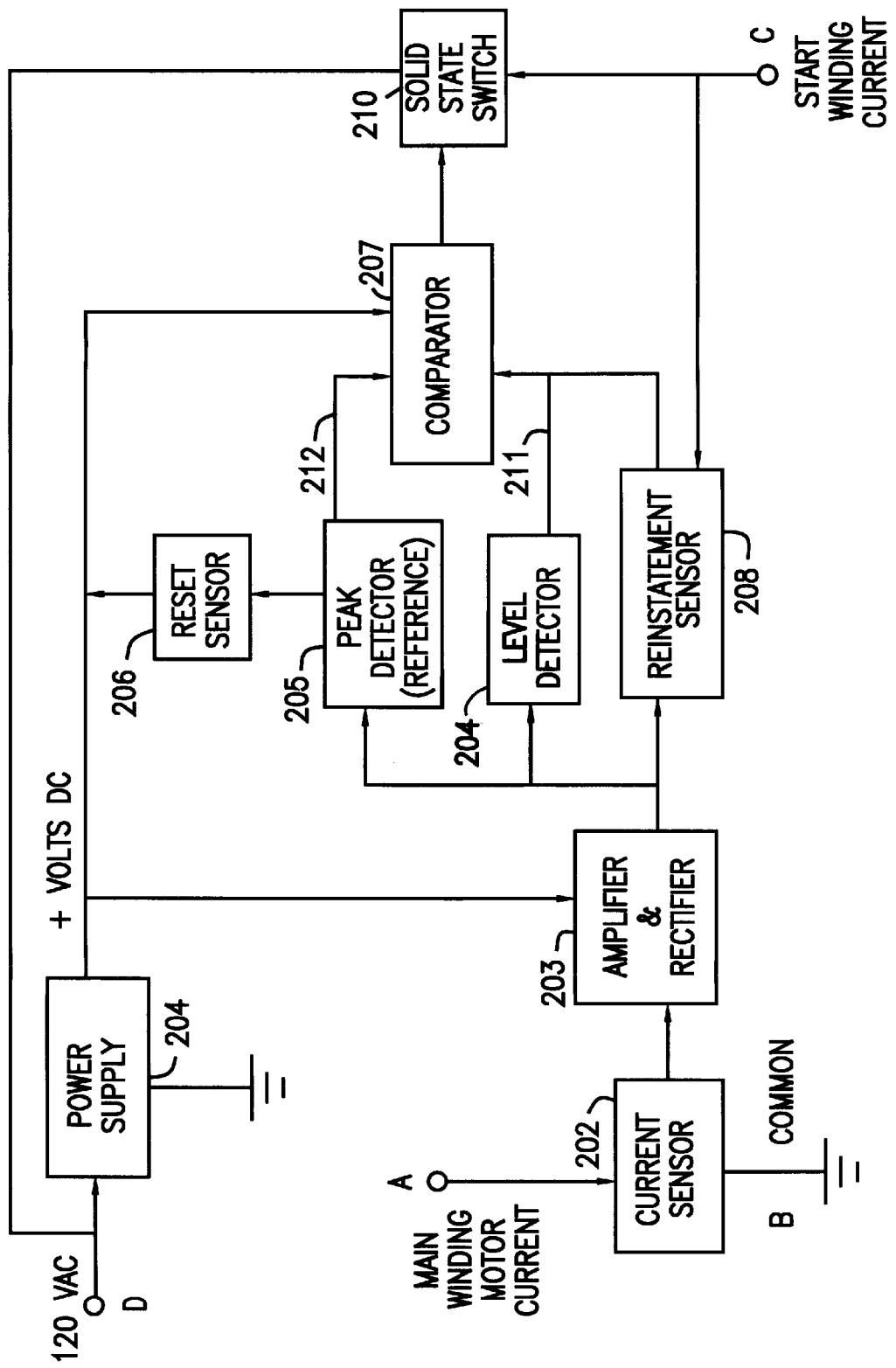
FIG. 2 shows a conceptual diagram of an exemplary apparatus for use in practicing the invention.

FIG. 2 shows a block diagram of the preferred embodiment of the present invention. The arrangement in FIG. 2 includes a variety of elements which can be constructed from well known electronics circuitry such as operational amplifiers, resistors, capacitors, etc.. Additionally, some or all of the functionality of several of the blocks may be implemented using digital hardware or software. The specific implementation of each block is not critical to the invention and the implementation of each block will not be described in detail herein.

FIG. 2 includes a current sensor 202, an amplifier and rectifier 203 followed by an exemplary power supply 204. The other elements include a level detector 204 for measuring a value of the current in the main winding 101, a peak detector 205 for measuring the maximum main winding current value as the motor starts turning, a reset sensor 206 and a comparator 207. Reinstatement sensor 208, and solid state switch 210 operate to keep the motor running when an increased load occurs, as described in more detail hereafter.

In operation, when the motor initially begins rotating, current sensor 202 measures the initial current and transmits such measurements to an amplifier and rectifier circuit 203. The amplifier and rectifier circuit outputs a voltage indicative of the amplitude of the alternating current passing through current sensor 202 and thus main winding 101. A peak detector 205 detects the value of this initial current and maintains such value, referred to as the reference value, by utilizing, for example, a capacitor or a digital storage latch. The capacitor is preferably arranged in an RC circuit with a relatively long time constant so that it holds the reference value for a long time.

As the motor continues to operate, the amplifier and rectifier 203 continues to detect the value of the current passing through current sensor 202, and outputs a DC value representing the main winding current magnitude, referred to as the present level. Level detector 204 then detects that level and then comparator 207 is utilized to compare the reference value with the present level. If the present level falls below the reference value, comparator 207 will indicate such at its output. Comparator 207 compares the present level from the level detector output 211 to the reference value from the peak detector output 212.

Both the peak detector 205 and level detector 204 may be implemented using RC circuits, but the peak detector 205 should have a much longer time constant. The level detector should have a time constant that allows it to follow the envelope of the current sensor 202. In this manner, the level detector 204 follows substantially the rectified output from amplifier and rectifier 203, while peak detector 205, having a much longer time constant, will hold the initial peak value.

When the level detector output 211 falls below peak detector output 212, comparator 207 switches the start winding out of the circuit via solid state switch 210. Additionally, the level detector output 211 to comparator 207 is changed when the present level of level detector 204 falls below the predetermined fraction of the initial lock up current or reference value. For example, the level detector output 211 may be divided by two, thus keeping it well below the peak detector output 212. Thus, if the reference value is 80 percent of the initial current, when level detector 204 outputs a value of 80 percent of the initial value, the level detector output 211 is switched so that the value being compared to peak detector output 212 is no longer a representation of the main winding current, but rather, some small percentage thereof.

In order to reinstate the start winding when the motor load increases, the present arrangement compares two dynamically variable parameters. Specifically, it has been previously pointed out herein that as the speed of the rotor increases, the current through main winding 101 decreases. It has also been determined that as rotor speed increases, the voltage induced by the rotor across the start winding 102 increases.

Figure 3:
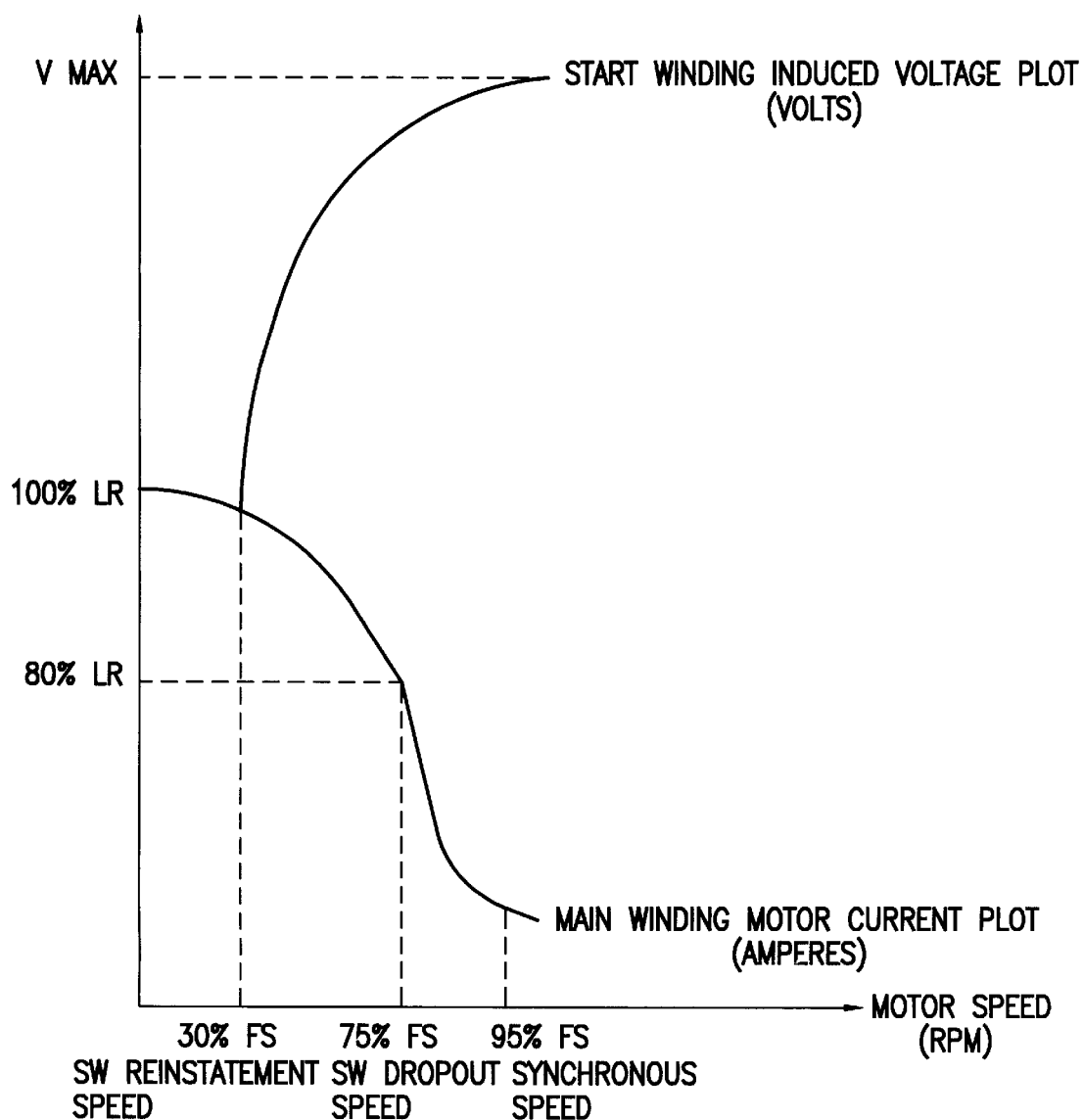
FIG. 3 shows a plot of start winding induced voltage versus rotor speed, and a plot of the main winding current versus rotor speed.

FIG. 3 shows a plot of start winding induced voltage versus speed of the rotor after the start winding has been removed from circuit. When the start winding 102 voltage is equal to approximately 0.5 times the main winding 101 current, the start winding 102 will be reinstated. This represents the point where the motor is about to lock up if the start winding is not reinstated. Therefore, as the rotor speed increases, main winding current decreases and start winding voltage increases in a predetermined manner. The two can be constantly compared by the reinstatement sensor 208 so that the relationship set forth above triggers comparator 207 to reinstate the start winding. Once the start winding is reinstated, the reinstatement sensor 208 is deactivated until the start winding is removed from circuit again by the solid state switch 210.

In another embodiment, the slope of the main winding current is utilized to reinstate the motor. Specifically, another dynamically variable parameter which changes during operation of the motor is the slope of the main winding current. After the start winding is disconnected based upon the main winding current decreasing below the reference level, the start winding may be reinstated when the main winding current increases by 40% or more in less than two seconds. This indicates a rapid rise in main winding current and a corresponding slow down in rotor speed.

The reset sensor 206 will activate when the power is removed from the power supply 204. Once activated the reset sensor 206 will clear the reference value in the peak detector 205. The function of the reset sensor 206 is necessary so that the reference value is established uniquely every time the motor is started. Additionally, during operation, each time the load on the motor increases so that rotor speed slows to near stall, the reference value is reset. This is because as motor load increases, the current in main winding 101 increases, thus causing rectifier 203 to restore a new reference value in peak detector 205.

While the above describes the preferred embodiment of the invention, various other modifications or additions will be apparent to those of ordinary skill in the art. Such modifications are intended to be covered by the following claims.

What is claimed is:

1. A method of controlling an induction motor with a start winding and a main winding comprising the steps of:

comparing a value indicative of a peak amplitude associated with a first electrical signal in the main winding with a value indicative of a peak amplitude associated with a second electrical signal in the start winding, said first and second electrical signals, and a relationship between said signals, varying as the induction motor operates; and connecting the start winding when the values indicative of said peaks have a predetermined relationship.

2. The method of claim 1 wherein said predetermined relationship is that the main winding current is approximately twice the start winding voltage induced by said rotor.

* * * * *